(12) United States Patent
Willard et al.

(10) Patent No.: US 7,758,100 B2
(45) Date of Patent: Jul. 20, 2010

(54) RETRACTABLE VEHICLE TOP AND COMBINED PACKAGE SHELF AND TONNEAU COVER

(75) Inventors: Michael T. Willard, Harrison Township, MI (US); Jan Just, Bloomfield Hills, MI (US)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 181 days.

(21) Appl. No.: 11/815,342

(22) PCT Filed: Feb. 3, 2006

(86) PCT No.: PCT/US2006/003739

§ 371 (c)(1),
(2), (4) Date: Aug. 2, 2007

(87) PCT Pub. No.: WO2006/084070

PCT Pub. Date: Aug. 10, 2006

(65) Prior Publication Data

US 2010/0013264 A1    Jan. 21, 2010

Related U.S. Application Data

(60) Provisional application No. 60/649,716, filed on Feb. 3, 2005.

(51) Int. Cl.
*B60J 7/00* (2006.01)
(52) U.S. Cl. ............................ 296/107.08; 296/107.17
(58) Field of Classification Search ............ 296/107.08, 296/108, 107.17, 121, 76, 107.07, 107.01, 296/117, 107.09
See application file for complete search history.

(56) References Cited

U.S. PATENT DOCUMENTS

| 3,575,464 | A | * | 4/1971 | Himka et al. | 296/117 |
| 6,299,234 | B1 | * | 10/2001 | Seel et al. | 296/108 |
| 6,336,673 | B1 | * | 1/2002 | Rothe et al. | 296/107.17 |
| 6,425,621 | B2 | | 7/2002 | Miklosi et al. | |
| 6,478,362 | B2 | * | 11/2002 | Obendiek | 296/108 |
| 6,502,891 | B2 | * | 1/2003 | Russke | 296/107.17 |
| 6,659,534 | B2 | | 12/2003 | Willard | |
| 6,666,495 | B2 | * | 12/2003 | Nania | 296/107.08 |
| 6,695,386 | B1 | * | 2/2004 | Willard | 296/107.17 |

(Continued)

FOREIGN PATENT DOCUMENTS

DE            19639504 A1    4/1998

(Continued)

*Primary Examiner*—Kiran B. Patel
(74) *Attorney, Agent, or Firm*—Brooks Kushman P.C.

(57) ABSTRACT

A retractable hardtop assembly is provided for a vehicle. A retractable hardtop assembly includes a front section that is connected by a linkage to a vehicle and a rearward portion that is connected by a separate linkage to a decklid of the vehicle. A package shelf/tonneau is secured by a linkage to the back section of the linkage. The package shelf/tonneau is moved from a package/shelf position below the rearward portion of the roof to a tonneau position above the retractable roof when the retractable roof is disposed in the storage compartment. The package shelf/tonneau is moved between the front portion of the roof and rearward portion of the roof during the extension and retraction cycles. The package shelf/tonneau may be rotated 360° as it is moved between the package shelf and tonneau positions.

7 Claims, 4 Drawing Sheets

U.S. PATENT DOCUMENTS

| | | | |
|---|---|---|---|
| 6,808,222 B2 * | 10/2004 | Quindt | 296/108 |
| 6,837,533 B2 | 1/2005 | Wojciech et al. | |
| 6,866,325 B2 * | 3/2005 | Willard | 296/108 |
| 7,014,247 B2 * | 3/2006 | Dilluvio | 296/107.17 |
| 7,063,371 B2 * | 6/2006 | Willard | 296/107.17 |
| 7,172,235 B2 * | 2/2007 | Rosler et al. | 296/107.08 |
| 7,309,098 B2 * | 12/2007 | Neubrand | 296/107.17 |
| 7,344,180 B2 * | 3/2008 | Halbweiss et al. | 296/108 |
| 7,374,226 B2 * | 5/2008 | Obendiek | 296/121 |
| 7,500,709 B2 * | 3/2009 | Heselhaus | 296/107.07 |
| 7,559,597 B2 * | 7/2009 | Mori | 296/108 |
| 2001/0006297 A1 * | 7/2001 | Dintner et al. | 296/107.17 |
| 2001/0024050 A1 * | 9/2001 | Schutt et al. | 296/107.08 |
| 2003/0042751 A1 * | 3/2003 | Antreich | 296/107.17 |
| 2004/0036312 A1 * | 2/2004 | Eichholz et al. | 296/107.08 |
| 2008/0129076 A1 * | 6/2008 | Araki et al. | 296/107.08 |

FOREIGN PATENT DOCUMENTS

| | | |
|---|---|---|
| EP | 1197368 A2 | 4/2002 |
| WO | 2005032867 A2 | 4/2005 |

* cited by examiner

RETRACTABLE VEHICLE TOP AND COMBINED PACKAGE SHELF AND TONNEAU COVER

CROSS-REFERENCE TO RELATED APPLICATIONS

This application claims the benefit of U.S. provisional application Ser. No. 60/649,716 filed Feb. 3, 2005.

BACKGROUND OF THE INVENTION

1. Field of the Invention

The present invention relates to a retractable hardtop assembly for a vehicle that includes a package shelf that also functions as a tonneau cover.

2. Background Art

Convertible tops for vehicles may be of the conventional soft top type or may be of the retractable hardtop type. Recent advances in the design and construction of retractable hardtops have broadened the appeal of this type of convertible top. Retractable hardtops provide a solid top for the vehicle when the top is in its extended or covering position. The solid vehicle top provided by a retractable hardtop offers the advantage of providing a roof that is very similar in terms of performance and appearance to a standard coupe or sedan style permanent roof. Retractable hardtops can offer similar sound installation, durability and styling to conventional vehicle roof structures. Retractable hardtop roofs were initially introduced for premium vehicles due to the cost of a retractable hardtop. However, improvements in manufacturing techniques and retractable hardtop designs have made retractable hardtops a viable option for a broader spectrum of vehicles. Retractable hardtops may be provided that are more cost competitive with soft top convertibles.

Convertible tops and retractable hardtops are both stored in either a storage compartment or a portion of the trunk of a vehicle. For retractable hardtops, the space required to store the retractable hardtop is an important design parameter. There is normally a need to provide a package shelf between the rearmost seat and lower edge of the roof. There is also a need to provide a tonneau cover that covers the same area after the retractable hardtop is retracted. These requirements further complicate the design of the complete retractable hardtop assembly. The package shelf and tonneau both must be provided with a top surface that is a class A surface.

The tonneau cover, that in many instances is a separate part from a package shelf, opens to allow the top to move into the storage compart when the top is retracted. A BMW 3 Series soft top convertible is available that has a tonneau cover that also functions as a package shelf. The BMW 3 Series has a five bow that pivots in a reverse direction to lift the five bow off of the tonneau during the retraction and extension cycle. This approach is not adaptable to retractable hardtop designs. The lower edge of the retractable hardtop cannot be raised in the manner of a five bow of a soft top. Without raising the lower edge of the retractable hardtop, there is no clearance for opening and closing the tonneau to allow for raising and lowering the roof.

These and other problems are addressed by this invention as will be more fully understood in view of the attached drawings and following detailed description of the retractable hardtop assembly.

SUMMARY OF THE INVENTION

According to one aspect of the present invention, a retractable hardtop assembly is provided for a vehicle that has a storage compartment for the retractable hardtop. The retractable hardtop assembly comprises a retractable roof having a forward portion and a rearward portion that may be deployed in an extended position to cover the passenger compartment of the vehicle. A linkage is provided that has a front section connected to the forward portion of the roof and a back section that is connected to the rearward portion of the roof. A package/shelf tonneau is secured by a package shelf/tonneau linkage to the back section of the linkage. The package shelf/tonneau is moved by the package shelf/tonneau linkage from a package shelf position below the rearward portion of the roof to a tonneau position above the retractable roof when the retractable roof is disposed in the storage compartment. The package shelf/tonneau is moved by the package shelf/tonneau linkage between the front portion of the roof and the rearward portion of the roof.

According to other aspects of the present invention, the rearward portion of the roof may have a back light that is connected by the back section of the linkage to a rear decklid. The back light rests upon the package shelf/tonneau when the package/shelf tonneau is in the package shelf position and the back light is moved into the storage component below the package shelf/tonneau when the package/shelf tonneau is in the tonneau position. The package shelf/tonneau is rotated 360° as it is moved between the package shelf and the tonneau positions. The forward portion of the roof may include a front panel and a mid panel that are connected by the front section of the linkage to the vehicle. The front panel may be connected by the front section of the linkage to the mid panel with the front panel and mid panel being contiguous with each other in the extended position and the front panel being stored above the mid panel in the storage compartment. The package shelf/tonneau has a seal on one edge that seals against a forward edge of the rear decklid in the package shelf position and in the tonneau position. The rearward portion of the roof, the package shelf/tonneau, and a rear decklid all pivot about a transverse axis located at a back portion of the rear decklid at an initial part of a retraction cycle and an extension cycle.

According to another aspect of the present invention, a retractable hardtop assembly for a vehicle having a passenger compartment and a storage compartment is provided. The passenger compartment is covered by the retractable hardtop assembly in an extended position. The retractable hardtop assembly is stored in the storage compartment in a retracted position. The retractable hardtop assembly comprises a front roof section that is moved between the extended and retracted positions by a front linkage. The retractable hardtop assembly also includes a rear roof section that has a rear light panel and a package shelf/tonneau that are moved separately from the front roof section by a rear decklid and a rear linkage between the extended and retracted positions. The package shelf/tonneau functions as a package shelf in the extended position and functions as a tonneau cover in the retracted position.

According to other aspects of the invention, the package shelf/tonneau may be moved between the front roof section and the rear roof section whenever the retractable hardtop assembly is moved between the extended and retracted positions. The package shelf/tonneau is rotated on the rear linkage 360° whenever the retractable hardtop assembly is moved between the extended and retracted positions. The rearward portion of the roof, the package shelf/tonneau and the rear decklid all pivot about a transverse axis located at a back portion of the rear decklid at an initial part of a retraction cycle and an extension cycle.

According to another aspect of the present invention, a method of retracting a retractable hardtop assembly on a vehicle having a passenger compartment and a storage compartment is provided. The retractable hardtop assembly has a front roof section, a rear roof section, a package shelf/tonneau, a decklid, a front linkage that connects the front roof section to the vehicle in an articulated manner, and a rear linkage that connects the rear roof section to the decklid in an articulated manner. The method comprises pivoting the decklid in a first direction about a transverse pivot axis located at a rear portion of the decklid to lift the package shelf/tonneau, the rear roof section and the rear linkage. The front roof section is moved from above the passenger compartment to the storage compartment. The package shelf/tonneau is rotated around a front edge of the rear roof section on a package shelf/tonneau linkage from a position below the rear roof section to a position above the rear roof section as the rear roof section is moved to the storage compartment. The decklid is pivoted in a second direction that is opposite the first direction about the transverse pivot axis to lower the package shelf/tonneau rear roof section and the rear linkage to the retracted position.

According to other aspects of the method of the present invention, the package shelf/tonneau in the extended position functions as a package shelf below the rear roof section and the method further comprises forming a seal between the decklid and the package shelf/tonneau when the roof is in the extended position. The package shelf/tonneau, when the retractable hardtop assembly is in the retracted position, functions as a tonneau that is disposed above the rear roof section. The method further comprises forming a seal between the decklid and the package shelf/tonneau when the roof sections are in the retracted position. According to other aspects of the method, the front roof section is moved into the storage compartment and below the rear roof section before the step of pivoting the decklid in the second direction. The method also may include providing a front roof section having a front panel and a mid panel wherein the method further comprises shifting the front roof panel over the mid roof panel before the front roof section is moved to the storage compartment.

The method may also further comprise a method of extending the retractable hardtop assembly wherein the retraction process is performed as described above. The retractable hardtop assembly is extended by pivoting the decklid in the first direction about the transverse pivot axis located at the rear portion of the decklid to lift the package shelf/tonneau, the rear roof section, and the rear linkage. The front roof section is then moved from the storage compartment to the position above the passenger compartment. The package shelf/tonneau is rotated around the front edge of the rear roof section on the package shelf/tonneau linkage from the position above the rear roof section to the position below the rear roof section as the rear roof section is moved from the storage compartment. The decklid is pivoted in the second direction about the transverse pivot axis to lower the package shelf/tonneau, the decklid, rear roof section, and the rear linkage to the extended position.

DETAILED DESCRIPTION OF THE ILLUSTRATED EMBODIMENT

Figure 1:
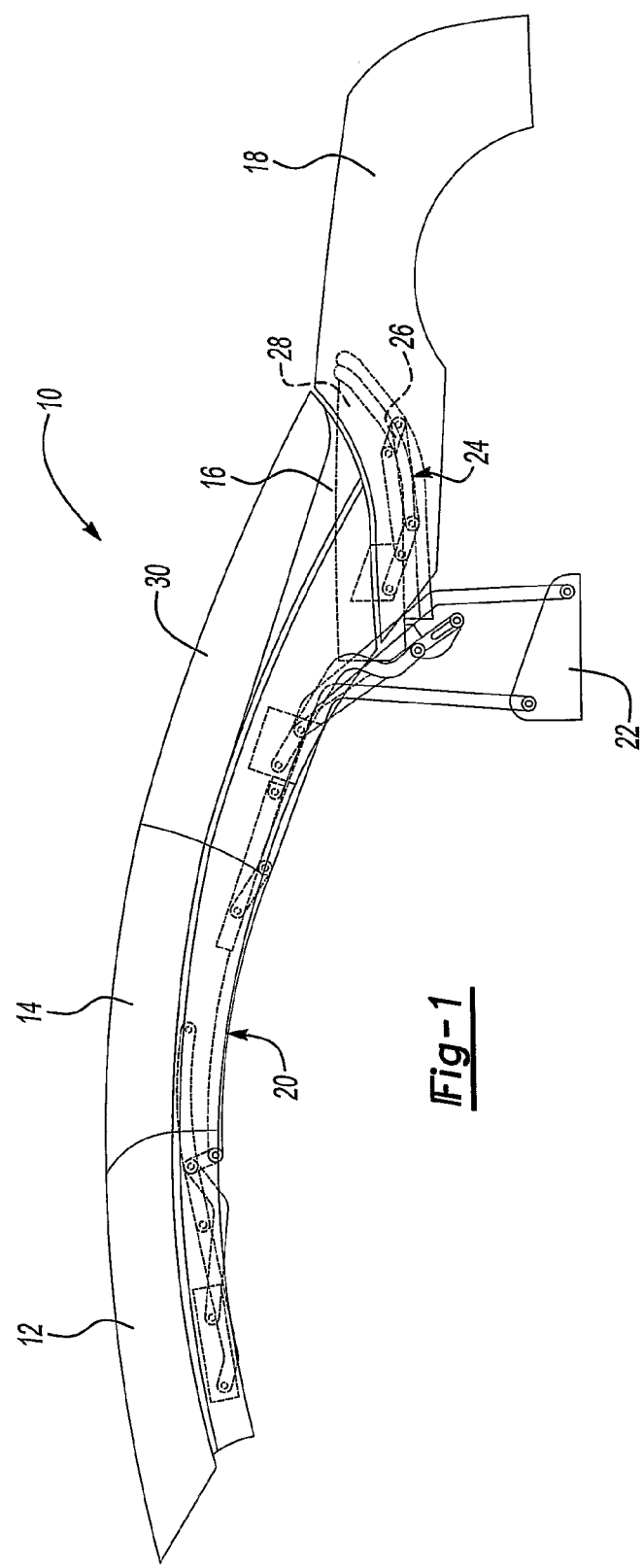
FIG. 1 is a side elevation view of a retractable hardtop assembly made in accordance with one embodiment of the present invention.

FIG. 1 shows a retractable hardtop assembly 10 made in accordance with one embodiment of the present invention in its extended position. The retractable hardtop assembly 10 includes a forward roof section 12, a mid-roof section 14 and a rear roof section 16. The rear roof section 16 is linked to and associated with a decklid 18. The decklid 18 has a rear pivot mechanism (not shown) that allows the decklid 18 to pivot on an axis near the rear edge of the decklid relative to the vehicle.

A front top stack linkage 20 articulately connects the forward roof section 12 and mid-roof section 14 to a main attachment bracket 22 that is secured to the vehicle. The forward roof section and mid-roof section may be jointly referred to as a front portion of the roof. The front top stack linkage 20 moves the forward roof section 12 and mid-roof section 14 between their extended position as shown in FIG. 1 and a retracted position in which the forward roof section 12 and mid-roof section 14 are stored in the trunk or in a storage compartment within the trunk.

A rear linkage 24 connects the rear roof section 16 and decklid 18. The rear linkage 24 is secured to the decklid 18 by a decklid mount 26. The rear linkage 24 also connects a package shelf/tonneau 28 to the rear roof section 16. The rear roof section 16 includes a rear light 30, which is preferably a rigid clear member made of glass or hard plastic material.

Figure 2:
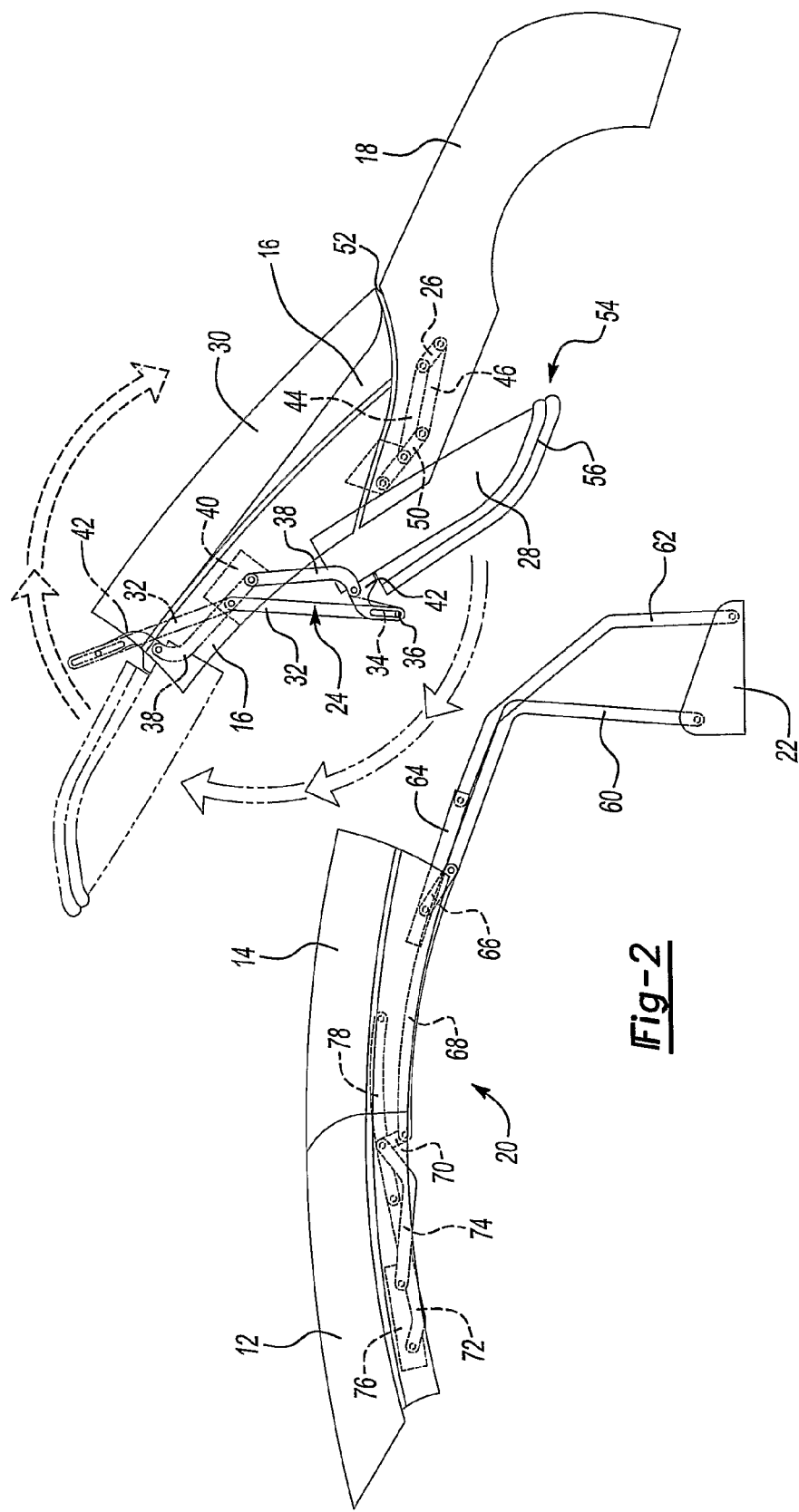
FIG. 2 is a side elevation view showing the retractable hardtop assembly according to one embodiment of the present invention with the decklid raised and a rear linkage partially rotating a package shelf/tonneau as the retractable hardtop is retracted.

Referring now to FIG. 2, the hardtop assembly 10 is shown at the beginning of its retraction cycle. The decklid 18 pivots upwardly about a rear pivot point. The package shelf/tonneau 28 is moved by a first package shelf/tonneau link 32. A slot 34 receives a pin 36 and is formed in a second package shelf/tonneau link 38. The package shelf/tonneau 28 is moved from the position shown in FIG. 1 to the position shown in solid lines in FIG. 2 through an arcuate path to the position shown in phantom lines in FIG. 2. The package shelf/tonneau 28 is rotated relative to the rear roof section 16 in front of and over the rear roof section 16. A rear roof section bracket 40 is provided on the rear roof section 16 and is pivotally connected to the first and second package shelf/tonneau link 32, 38. A package shelf/tonneau bracket 42 is secured to the second link 38 by the pin 36 that is received in the slot 34. The pin 36 moves in the slot 34 to provide an additional degree of travel for the package shelf/tonneau 28. The package shelf/tonneau bracket 42 secures the opposite ends of first and second package shelf/tonneau link 32, 38 to the package shelf/tonneau 28.

The rear roof section 16 is connected to decklid 18 by a first decklid/rear roof section link 44 and a second decklid/rear roof section link 46. The first and second decklid/rear roof section links 44, 46 shift the rear roof section from the position shown in FIG. 1 to a retracted position wherein the rear roof section 16 is disposed within the storage compartment generally below the decklid 18. A rear roof section link 50 connects the second decklid/rear roof section link 46 to the rear roof section 16. The rear roof section 16 drops through the storage compartment opening 52 that is formed in the decklid 18. The storage compartment opening 52 provides access to the storage area 54 that is located generally below the front portion of the decklid 18. A seal 56 is provided on package shelf/tonneau 28 that seals the storage compartment opening 52 in the decklid 18 when the package shelf/tonneau 28 is in its retracted position and functioning as a tonneau cover for the retracted hardtop.

Figure 3:
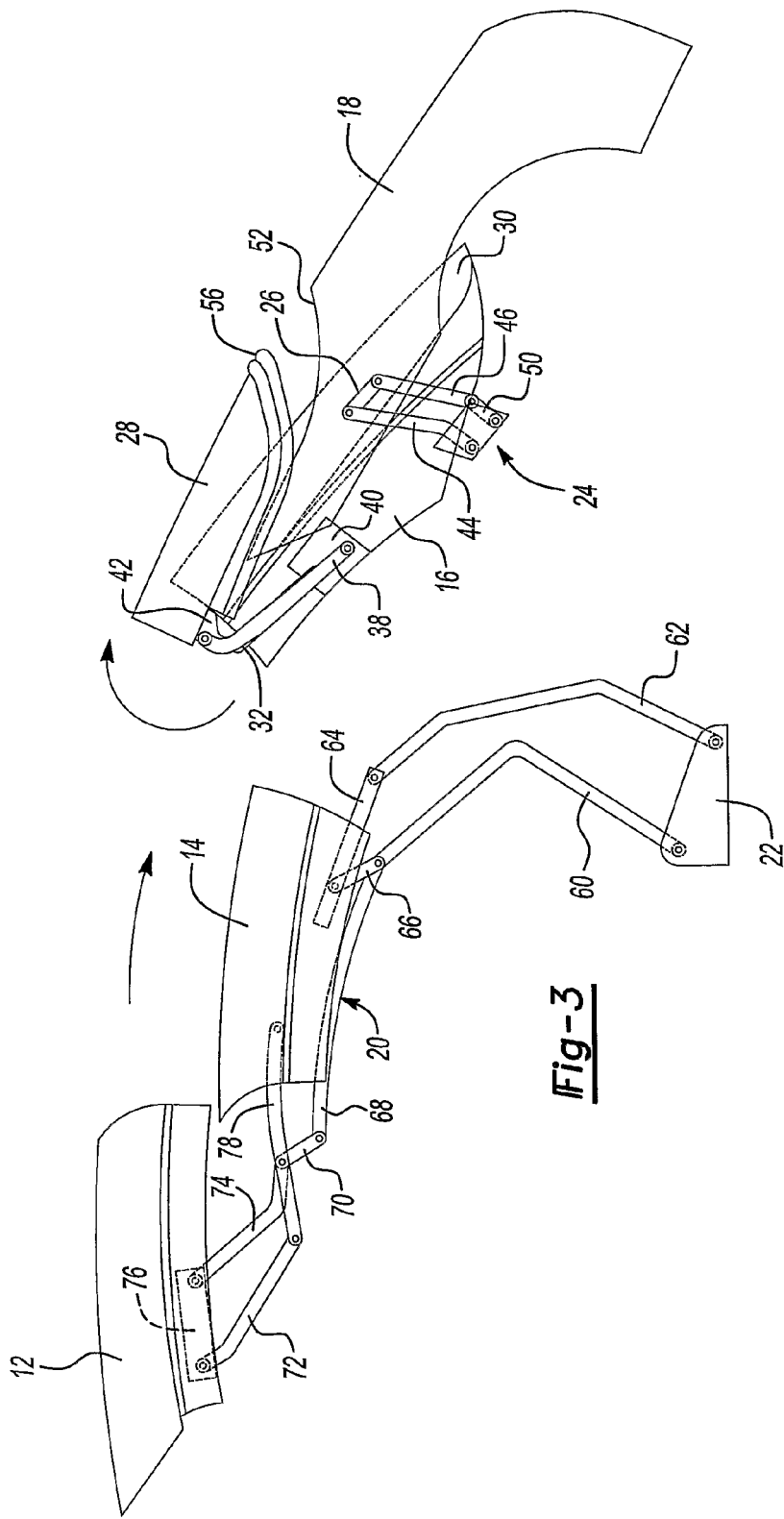
FIG. 3 is a side elevation view showing the retractable hardtop assembly according to one embodiment of the invention with a front linkage partially retracted and the rear linkage nearly fully retracted.

Referring now to FIGS. 2 and 3, further retraction of the package shelf/tonneau 28 and the initial retraction of the front top stack linkage 20 will be explained as the next step in the retraction process. The package shelf/tonneau 28 is shown above the rear roof section 16 having been rotated by the first and second package shelf/tonneau link 32, 38 having completed a nearly full rotation about the rear roof section 16. The rear roof section 16 is disposed within the storage compartment 54 and below the upwardly pivoted decklid 18. The package shelf/tonneau 28 is pivoted relative to the rear roof section 16 while the rear roof section 16 is pivoted relative to the decklid 18. Each are pivoted on four bar link mechanisms that permit controlled movement of the rear roof section 16 and package shelf/tonneau 28.

The front top stack linkage 20 is shown in FIG. 3. A main link 60 and a balance link 62 rotate rearwardly to cause the front roof section 12 to be moved over the mid-roof section 14. The balance link 62 is connected to a mid-roof rear extension link 64 that is secured to the mid-roof section 14. A mid-roof pivot link 66 is connected to the mid-roof rear extension link 64 and the main link 60. The main link 60 and mid-roof pivot link 66 are also pivotally connected to the side link 68. The main link 60 and balance link 62 connect the mid-roof section 14 to the main attachment bracket 22. Side link 68 connects the mid-roof 14 through the mid-roof pivot link 66 to a front roof pivot link 70. The forward roof section 12 is pivotally connected to a first front roof link 72 and a second front roof link 74 by means of a front roof bracket 76. A mid-roof front extension link 78 extends from the mid-roof section 14 forwardly and is connected to the first front roof link 72.

During the retraction cycle, the main link 60 and balance link 62 are rotated in a rearward, or clockwise, direction as shown in FIG. 3. The balance link 62 pulls the mid-roof rear extension link 64 rearwardly while the main link 60 drives the side link 68 forward on the mid-roof pivot link 66 and front roof pivot link 70. This causes the forward roof section 12 to lift up and shift rearwardly to a position over the mid-roof section 14 as the mid-roof section 14 is moved rearwardly towards the storage compartment.

Figure 4:
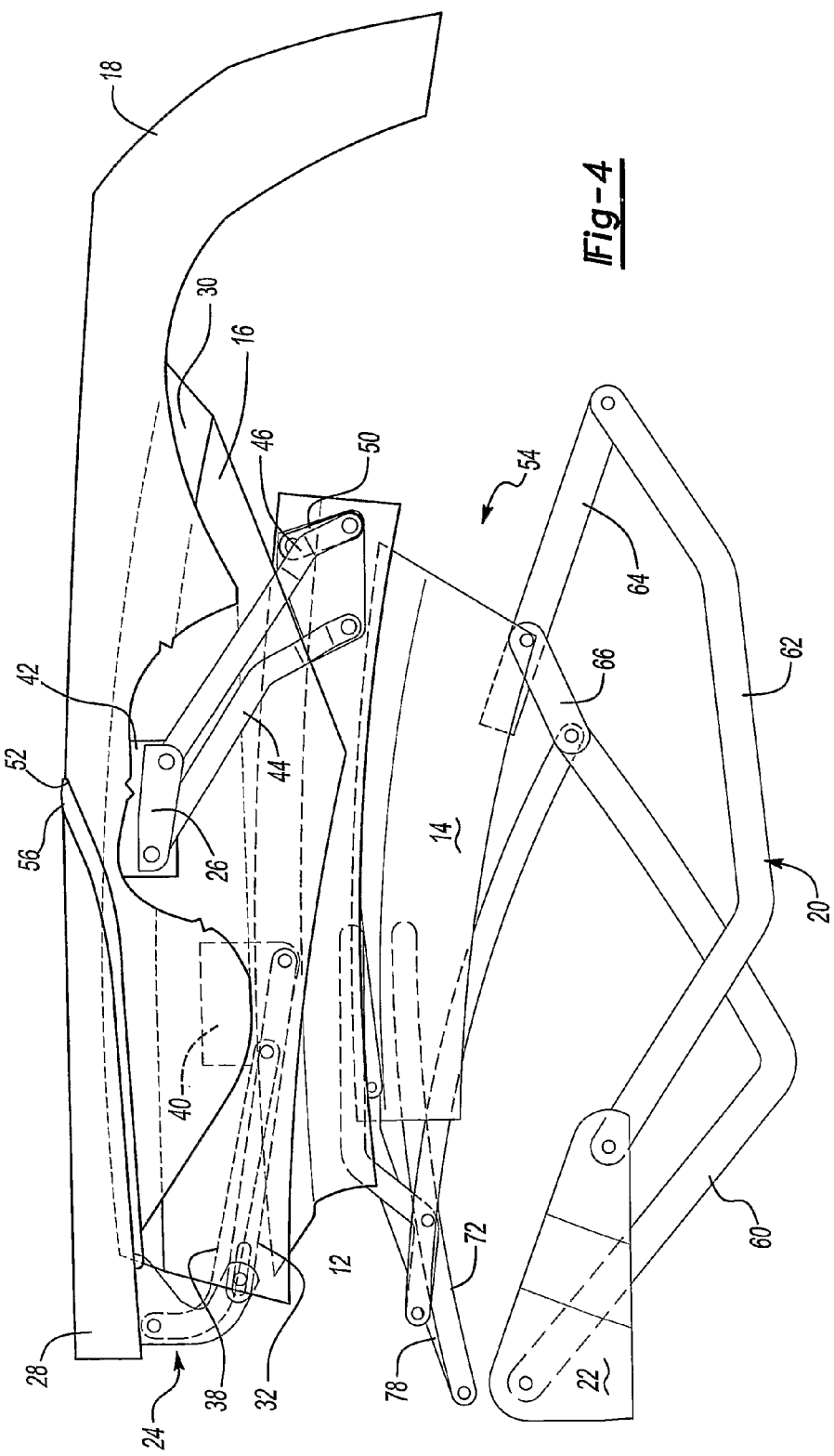
FIG. 4 is a side elevation view of the retractable hardtop assembly shown in its retracted position.

Referring now to FIG. 4, the retractable hardtop assembly illustrated in FIGS. 1-3 is shown in its retracted position. Several of the links of the front top stack linkage and rear linkage are not shown to simplify the illustration. In FIG. 4, the front top stack linkage 20 is shown with the forward roof section 12 pivoted to a position above the mid-roof section 14 in the lower portion of the storage area 54. The decklid 18 is shown pivoted to its lower position with the rear roof section 16 disposed below the package shelf/tonneau 28. The package shelf/tonneau 28 is shown with its seal 56 engaging the storage compartment opening 52 in the decklid 18. The package shelf/tonneau 28 has completed its rotation about the rear roof section and has been moved from a position below the rear roof section 16 as shown in FIG. 1 to a position above the rear roof section 16 as shown in FIG. 4.

The retraction process is reversed to shift the roof from its retracted position to its extended or passenger compartment covering position. It should be understood that only one side of the roof is shown in the drawings and that a mirror image of the front top stack linkage 20 and rear linkage 24 is provided on the opposite side of the retractable hardtop assembly 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retractable hardtop assembly for a vehicle, the vehicle having a storage area, the assembly comprising:
 a retractable hardtop having forward sections and a rear section that may be deployed in an extended position to cover a passenger compartment of the vehicle;
 a front linkage that is connected to the vehicle and to the forward sections of the hardtop and a rear linkage that is connected to the rear section of the hardtop; and
 a package shelf/tonneau that is secured by a package shelf/tonneau linkage to the rear linkage, the package shelf/tonneau being moved by the package shelf/tonneau linkage through 360 degrees from a package shelf position below the rear section of the hardtop to a tonneau position above the retractable hardtop when the retractable hardtop is disposed in the storage area, the package shelf/tonneau being moved by the package shelf/tonneau linkage between the forward sections of the hardtop and the rear section of the hardtop.

2. The retractable hardtop assembly of claim 1 wherein the rear section of the hardtop has a rear light that is connected by the rear linkage to a decklid, the rear light resting upon the package shelf/tonneau when the package shelf/tonneau is in the package shelf position and the rear light being moved into the storage area below the package shelf/tonneau when the package shelf/tonneau is in the tonneau position.

3. The retractable hardtop assembly of claim 1 wherein the package shelf/tonneau linkage is a four-bar linkage that includes a link that defines a slot that receives a pin.

4. The retractable hardtop assembly of claim 1 wherein the forward sections of the hardtop includes a first forward section and a mid section that are connected by the front linkage to the vehicle.

5. The retractable hardtop assembly of claim 4 wherein the first forward section is connected by the front linkage to the mid section with the first forward section and mid section being contiguous with each other in the extended position and the first forward section being stored above the mid section in the storage area.

6. The retractable hardtop assembly of claim 1 wherein the package shelf/tonneau has a seal on one edge that seals against a forward edge of a rear decklid in the package shelf position and in the tonneau position.

7. The retractable hardtop assembly of claim 1 wherein the rear section of the hardtop, the package shelf/tonneau and a rear decklid all pivot about a transverse axis located at a back portion of the decklid at an initial part of a retraction cycle and an extension cycle.

* * * * *